United States Patent Office 3,505,036
Patented Apr. 7, 1970

3,505,036
PREPARATION OF ALKALI METAL HYDRIDES
Kenneth L. Lindsay, Baton Rouge, La., assignor to Ethyl Corporation, New York, N.Y., a corporation of Virginia
No Drawing. Filed Feb. 28, 1967, Ser. No. 619,166
Int. Cl. C01b 6/24, 6/26; C07b 1/00
U.S. Cl. 23—365                    10 Claims

ABSTRACT OF THE DISCLOSURE

A method of preparing alkali metal aluminum hydrides from the respective elements, using drastically reduced reaction times by reacting an alkali metal, or the hydride thereof, with aluminum powder and a catalytic quantity of (1) an aluminum alkyl and (2) a compound selected from $Ti(OR)_4$, $Zr(OR)_4$, $TiCl(OR)_3$, $Zr(OR)_3$, $TiCl_4$, and $ZrCl_4$, wherein R is an alkyl radical having 1–8 carbon atoms, in the presence of an inert liquid carrier, under an $H_2$ pressure of from 500 to 10,000 p.s.i. and at a temperature from about 50° C. to 200° C. Preferably, the $H_2$ pressure is maintained at about 2500–3500 p.s.i. while the reaction mixture is agitated constantly during the reaction. Reaction times are at least one-third normal.

BACKGROUND OF THE INVENTION

Field of the invention

This invention relates to a method for preparing alkali metal aluminum hydrides. More particularly, the invention relates to a method for preparing sodium aluminum tetrahydride and sodium aluminum hexahydride.

Description of the prior art

A method of preparing sodium aluminum hydride directly from the elements is the subject of pending U.S. patent application Ser. No. 751,862, filed July 30, 1958. Generally, the method comprises contacting sodium, or sodium hydride, and aluminum with hydrogen, at elevated temperatures and pressures, producing sodium aluminum hydride in good yields.

The patent to F. P. Del Giudice and R. C. Wade, U.S. No. 3,290,123, dated Dec. 6, 1966, describes a method for preparing a metal aluminum hydride having the formula $M(AlH_4)_x$ where M is a metal selected from alkali metals and alkaline earth metals and x is the valence of the metal. The method comprises reacting an alkali metal or alkaline earth metal, or the hydride thereof, with a finely divided aluminum alloy in the presence of hydrogen under superatmospheric pressure. The aluminum is alloyed with calcium, lithium, nickel, magnesium, lead or mercury. Reaction times are reported to be at least about 16 hours at a temperature of about 175° C. with continuous agitation.

A method of preparing sodium aluminum hexahydride, having the formula $Na_3AlH_6$, directly from the elements is the subject of pending U.S. patent application Ser. No. 363,598, filed Apr. 29, 1964. According to the specification, the invention comprises contacting metallic sodium or sodium hydride with subdivided aluminum in a reaction system including a dry, inert, solvent material in the presence of hydrogen, at elevated temperatures and pressures.

SUMMARY OF THE INVENTION

I have discovered a method whereby sodium aluminum hydride and other alkali metal aluminum hydrides can be synthesized directly from the elements, including the use of the hydride of the alkali metal, using drastically reduced reaction times while maintaining normal temperatures and pressures. In accordance with the method of the present invention an alkali metal, such as sodium, potassium or lithium, or the hydride thereof, is heated at an elevated temperature in a confined reaction zone with a finely divided aluminum powder in an inert liquid carrier in the presence of hydrogen under superatmospheric pressure while agitating the mixture until reaction between aluminum, hydrogen and the alkali metal, or hydride thereof, is substantially complete, having included in the reaction mixture a catalytic quantity of (1) an aluminum alkyl and (2) a compound selected from the group consisting of $Ti(OR)_4$, $Zr(OR)_4$, $TiCl(OR)_3$, $ZrCl(OR)_3$, $TiCl_4$ and $ZrCl_4$, wherein R is an alkyl radical having 1–8 carbon atoms.

The complex hydrides produced according to the present invention find ready and highly effective usage as selective and powerful reducing agents for various organic and inorganic compounds; i.e., in the production of benzylamine from benzonitrile, and the like. The sodium aluminum hexahydride produced is thermally stable at moderately warm temperatures and is inactive to dry air. It smoothly and rapidly reacts with water producing six moles of hydrogen gas per gram mole of the product, thus providing a convenient means of generating hydrogen gas for meteorological or military purposes. It is also useful as an intermediate for further processing with additional aluminum metal and hydrogen, to produce sodium aluminum tetrahydride, $NaAlH_4$.

DESCRIPTION OF THE PREFERRED EMBODIMENTS

Typically suitable compounds of the formula $Ti(OR)_4$ and $Zr(OR)_4$ are titanium isopropoxide, zirconium isopropoxide titanium isobutoxide, zirconium isobutoxide, titanium n-butoxide and the like. As used in the invention, the initial uptake of $H_2$, in the preparation of sodium aluminum hydride, is about 800–1000 pounds per hour, as compared with the normal rate of about 150–300 pounds per hour. The compound should be used at a level of about 0.1 to 20 mole percent, based on the aluminum powder present. A more preferred level of usage is from about 0.5 to 10 mole percent. It may be useful at times to add the titanium or zirconium compounds in spaced increments in order to maintain a consistently high $H_2$ uptake. In addition, these compounds may be used in conjunction with from about 50–10,000 parts per million metallic titanium or zirconium that has been alloyed with the aluminum powder.

When the process of the present invention is used, reaction times of 3–5 hours are attainable, whereas normal reaction times are about 15–17 hours.

The aluminum alkyl catalyst component has the general formula $AlR_2R'$, wherein R is an alkyl group containing 1–12 carbon atoms and R' is a radical selected from the group consisting of hydrogen and an alkyl group containing 1–12 carbon atoms. Suitable aluminum alkyls are triethyl aluminum, diethyl aluminum hydride, triisobutyl aluminum, diisobutyl aluminum hydride and the like. The most preferred aluminum alkyl catalyst component is triethyl aluminum. The aluminum alkyl is useful for the present invention when used at a level of about 0.5 to 20 mole percent, based on the aluminum powder present.

The reaction may be conducted at a temperature between about 50° C. and 200° C. and at a hydrogen pressure between about 500 and 10,000 pounds per square inch (p.s.i.). The most preferable temperature range is between about 120°–170° C. Preferred pressures for the invention range between 500 to about 5000 p.s.i., with the most preferred ranging betwen about 2000 to 5000 p.s.i.

Suitable inert liquid carriers are liquid hydrocarbons, such as hexane, octane, toluene, benzene, hexadecane, o-xylene, dodecane, and cyclohexane, the lower alkyl ethers, such as dimethyl ether, diethyl ether, diisopropyl ether, and dibutyl ether; and ethers, such as tetrahydrofuran, dioxane, dimethyl ether of ethylene glycol and dimethyl ether of diethylene glycol. The most preferred inert liquid carriers are toluene, tetrahydrofuran, and the dimethyl ether of ethylene glycol.

The benefits and advantages of the present invention are more readily understood in the following examples which are merely illustrative and are not intended to limit the scope of the invention.

EXAMPLE I

In preparing sodium aluminum tetrahydride, 0.5 mole each of aluminum powder and sodium metal were placed in a 250 ml. Magne-Drive reactor fitted with a magnetic stirrer and suitable heating means. About 100 ml. predried toluene was used. The temperature of the reactor was maintained at about 150° C. throughout the entire run, with continuous agitation of the reactants. There was added to the reactor, in addition to the above, 3 ml. of triethyl aluminum and 4 mole percent titanium isopropoxide. It was determined from elemental analysis that the aluminum powder used contained about 50 parts per million, based on the aluminum, titanium as an impurity. Hydrogen was introduced into the reactor under a pressure of about 2500 p.s.i. Pressure was maintained by addition of $H_2$ when the pressure dropped to at least 2000 p.s.i., and the total $H_2$ pressure drop recorded during the run. By this method, I was able to determine the total $H_2$ uptake during the reaction. When $H_2$ uptake ceases, the reaction is essentially complete. Total reaction time was 5 hours with a $H_2$ uptake of about 1000 lbs. per hour. $NaAlH_4$ was recovered at a yield of over 90 percent with a purity of 98–99 percent.

EXAMPLE II

A charge similar to that in Example I was made to a 250 ml. Magne-Drive reactor which was fitted with a stirrer and suitable heating means. Instead of using sodium metal, the reactor was charged with sodium hydride, NaH. The ratio of aluminum to sodium hydride charged to the reactor was 1 atom of aluminum to 1 mole of sodium hydride. The solvent in this run was dimethyl ether of diethylene glycol, which was used on the basis of 20 ml. of liquid to a gram of sodium hydride. The temperature was 150° C. and the initial hydrogen pressure was 3500 pounds. A reaction period of 8 hours was required to result in a hydrogen uptake of about 900 lbs. per hour, providing a conversion of 92 percent to sodium aluminum tetrahyride.

EXAMPLE III

Sodium aluminum hexahydride was prepared by charging to a 250 ml. Magne-Drive reactor, about 21 grams of metallic sodium and 8 grams of powdered aluminum, thus being in the proportions of 0.91 gram moles of sodium to 0.3 gram mole of metallic aluminum. 100 ml. of predried toluene was also charged. To the reaction mixture there was added in a stepwise manner 3 mole percent titanium isobutoxide. About 3 ml. of triisobutyl aluminum was also added to the reactor. The reactor was closed, heated to 155° C. and a pressure of 3500 p.s.i. dry hydrogen supplied. These reaction conditions were maintained for a period of 7 hours, the mixture being agitated throughout the period. At the end of ten hours, the rate of pressure drop had decreased considerably, showing termination of the reaction.

After cooling the reactor and contents to approximately room temperature, filtering and washing with the dimethyl ether of diethylene glycol, a weight loss of approximately one percent was observed. The product thus obtained was analyzed and found to have an atomic ratio of Na/Al of 3.06. X-ray diffraction analysis of this material showed that it was isomorphous to cryolite, $Na_3AlF_6$, and contained only trace quantities of aluminum and sodium hydride as impurities.

EXAMPLE IV

The procedure of Example I was repeated, omitting the titanium isopropoxide catalyst component. Using a hydrogen pressure of 2500 p.s.i. and a temperature of 150° C. with continuous stirring throughout the reaction, it took 14 hours to complete the reaction. Sodium aluminum tetrahydride was recovered at a yield of 89 percent. The hydrogen uptake throughout the run was about 100 lbs. per hour.

As indicated in the foregoing examples, a variety of conditions can be employed quite effectively in numerous embodiments of the process. The proportions of reaction medium can be varied greatly. A suitable range is the proportions of 50 to 1,000 milliliters (ml.) per gram atom of the aluminum initially charged, a preferred range being 100 to 500 ml.

The aluminum employed is preferably in higher subdivided particulate form, in order to provide a significant degree of surface and an appreciable reaction rate. Preferably, seventy-five percent of the aluminum powder should pass through a 300 mesh screen.

Generally, at a given level of catalyst components and constant temperature, reaction times decrease with an increase in pressure. Consequently, a balance of conditions for optimum product yield and purity is preferred over a reaction system designed solely to achieve minimum reaction times. The preferred embodiments, as given hereinbefore, are considered to be the optimum balance of reaction conditions.

I claim:

1. A method for preparing alkali metal aluminum hydrides which comprises heating in a confined reaction zone (1) a material selected from the group consisting of alkali metal and alkali metal hydride; (2) a finely divided aluminum; (3) from about 0.5 to 20 mole percent, based on the aluminum powder, of an aluminum alkyl; and (4) from 0.1 to 20 mole percent, based on the aluminum powder, of a compound selected from the group consisting of $Ti(OR)_4$ and $Zr(OR)_4$, wherein R is an alkyl radical having from 1–8 carbon atoms; in an inert liquid carrier at a temperature between 50° C. and 200° C. in the presence of hydrogen under a pressure between 500 and 10,000 pounds per square inch while agitating the mixture until reaction between said selected material, aluminum and hydrogen is essentially complete.

2. The method of claim 1 wherein selected material is sodium metal.

3. The method of claim 1 wherein said selected material is sodium hydride.

4. The method of claim 1 wherein said selected material is sodium and the molar ratio of sodium to aluminum is about 3.0.

5. The method of claim 1 wherein said selected material is sodium and the molar ratio of sodium to aluminum is about 1.0.

6. The method of claim 1 wherein said aluminum alkyl is triethyl aluminum.

7. The method of claim 1 wherein said aluminum alkyl is diethyl aluminum hydride.

8. The method of claim 1 wherein there is used from 0.5 to 10 mole percent $Ti(OR)_4$ where R is an alkyl radical having 1–8 carbon atoms.

9. The method of claim 8 wherein there is used from 0.5 to 10 mole percent titanium isopropoxide.

10. The method of claim 1 wherein said hydrogen pressure is maintained at from abut 500 to 3000 pounds per square inch.

(References on following page)

References Cited

UNITED STATES PATENTS

| | | | |
|---|---|---|---|
| 3,355,262 | 11/1967 | Baird et al. | 23—365 |
| 3,387,933 | 6/1968 | Snyder | 23—204 |

OTHER REFERENCES

Zeiss, H., Organometallic Chemistry, Reinhold Publishing Co., New York; 1960, page 195.

Zakharkin et al., "Academy of Sciences USSR," vol. 145, No. 4, August 1962.

OSCAR R. VERTIZ, Primary Examiner

G. O. PETERS, Assistant Examiner

U.S. Cl. X.R.

252—431